July 8, 1958 W. D. WEIKART ET AL 2,842,171
SABER SAW ATTACHMENT FOR CIRCULAR SAW TABLE
Filed Sept. 20, 1955 3 Sheets-Sheet 1
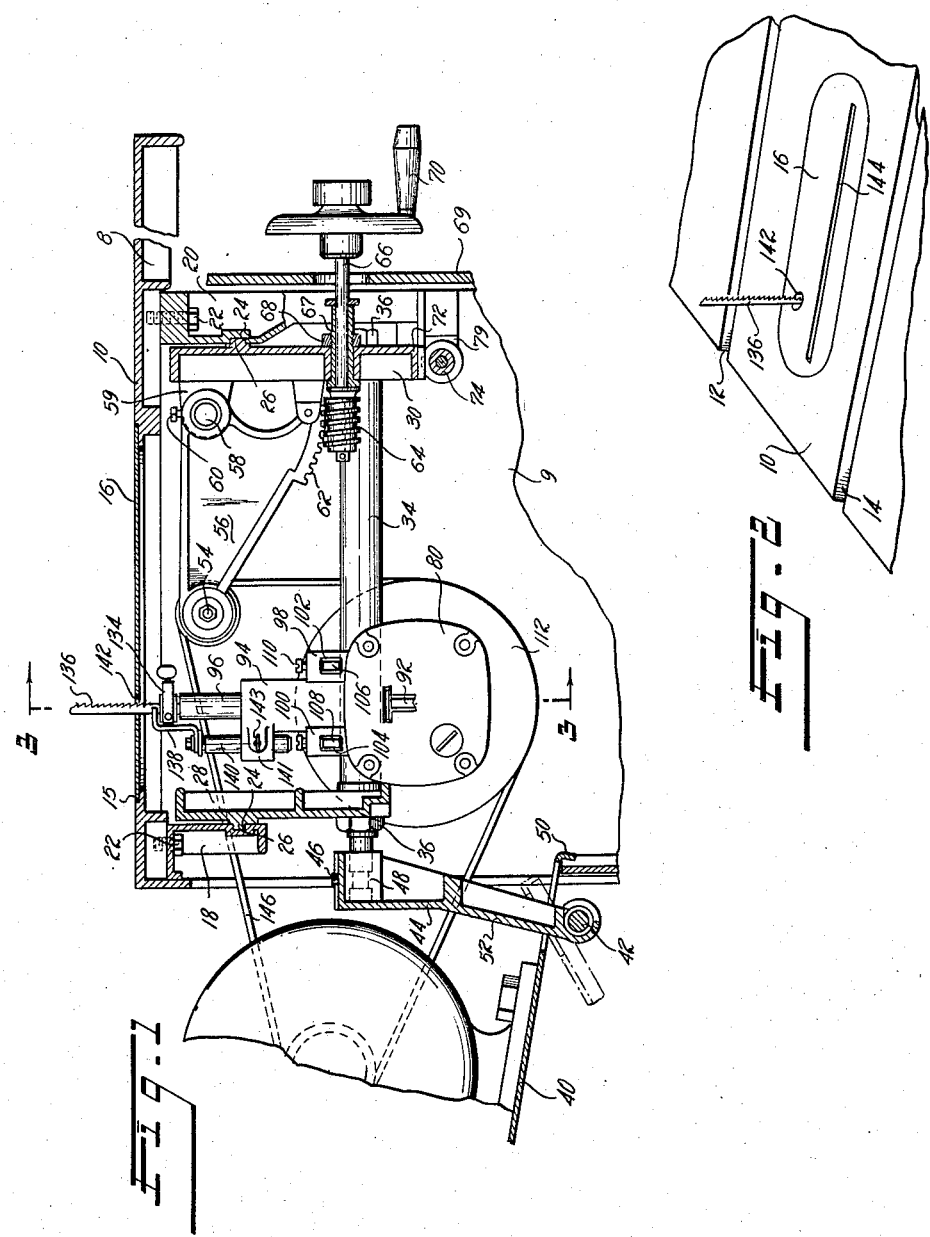
INVENTORS
W. DEAN WEIKART
EDWIN B. DEUSCHLE
BY
ATTORNEYS

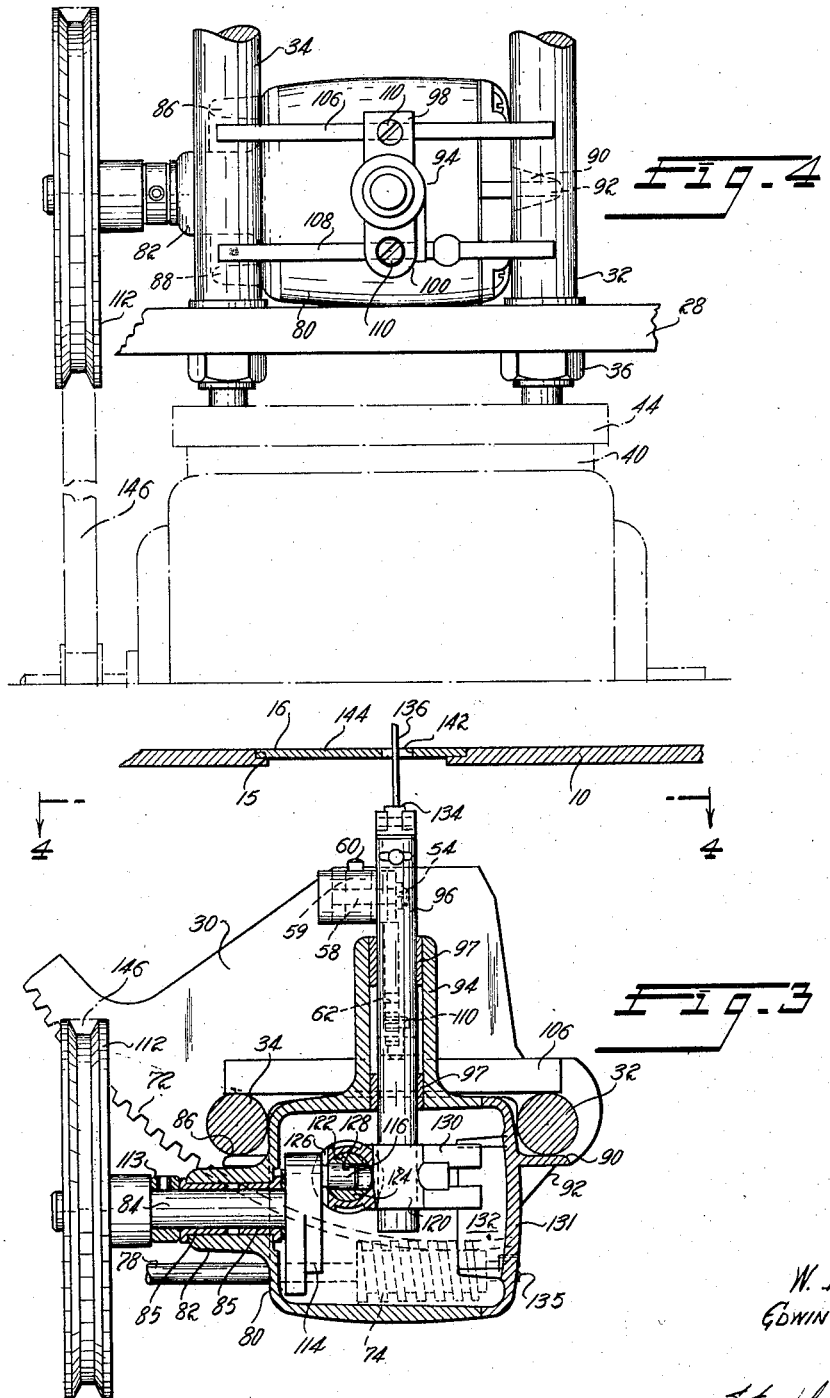

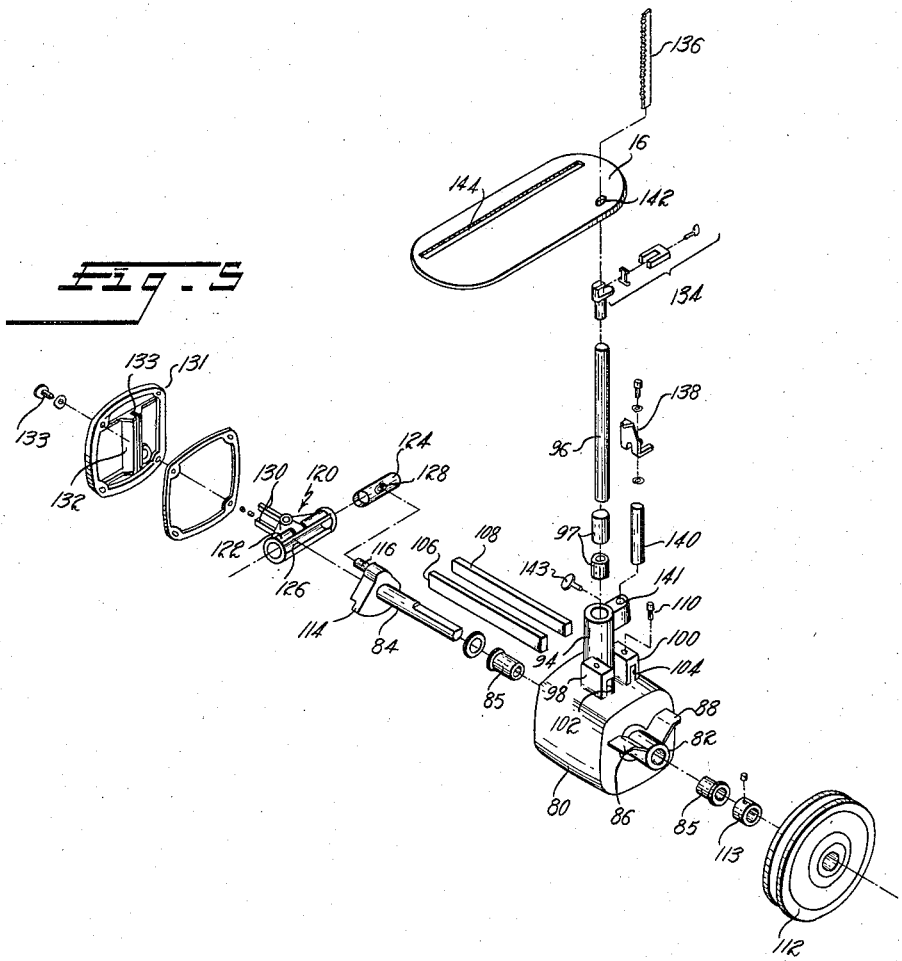

United States Patent Office 2,842,171
Patented July 8, 1958

2,842,171

SABER SAW ATTACHMENT FOR CIRCULAR SAW TABLE

Warren Dean Weikart and Edwin B. Deuschle, Tupelo, Miss., assignors to Rockwell Manufacturing Company, Pittsburgh, Pa., a corporation of Pennsylvania Application September 20, 1955, Serial No. 535,418

9 Claims. (Cl. 143—72)

This invention relates to a novel scroll or saber type saw and more particularly to a mounting unit adapted to mount a saber saw blade under the work table of a tilting arbor saw for operation by the arbor thereof.

In the field of home workshop power woodworking tools or tools for small shops, combination units are preferred which utilize a single basic tool to perform as many different operations as possible. One of the more popular basic units is a tilting arbor saw for which many attachments and accessories are commercially available.

The primary object of this present invention resides in providing a scroll or saber type saw unit formed mountable as an accessory or auxiliary unit under a tilting arbor saw table to be driven by the motor provided for driving the circular saw blade normally associated therewith.

Another important object of this invention is to provide a saber saw unit that is easily attachable to and removable from the saw table and is intended to be used only when the circular saw has been removed.

Still another object of this invention resides in providing a housing for an auxiliary saw unit which is preferably secured to the tilting arbor support mechanism of a tilting arbor saw table whereby movement of the tilt adjustment will tilt the saber saw thus enabling bevel cuts to be made with the saber saw blade.

A further object of the present invention is to provide a scroll or saber type saw unit for use as an accessory or attachment for a multi-purpose woodworking tool.

Another object of this invention is to provide a mount for a scroll saw which pivotally supports the scroll saw for movement about an axis lying in the plane of the work table so that accurately measurable bevel cuts may be made.

Still another object of this invention is to provide a scroll saw unit which is adapted to be mounted on the tiltable support member of a tilting arbor saw to be driven by the motor and pulley arrangement used to drive the circular saw blade carried by the tilting arbor.

These and other objects will become more fully apparent from the following description and appended claims when read in connection with the accompanying drawings wherein:

Figure 1 is a side elevational view in section of a tilting arbor saw table with the scroll saw shown in operating position;

Figure 2 is a fragmentary view of the top of the work table showing the scroll saw blade extending through the work surface;

Figure 3 is a partial elevational view in section taken along lines 3—3 of Figure 1;

Figure 4 is a partial plan view taken along lines 4—4 of Figure 3; and

Figure 5 is an exploded pictorial view of the saber saw mechanism.

Referring to Figure 1, there is illustrated a work table 8 supported on a cabinet 9 and having a flat top 10 forming a horizontal working surface. The plane surface of the table top is interrupted by a pair of spaced parallel grooves or channels 12, 14 and has a transversely centered oblong blade access opening 15 containing a saw table insert 16.

A pair of spaced aligned trunnion brackets 18 and 20 are detachably secured to the underside of table top 10 as by bolts 22. Each trunnion bracket is formed with an arcuate groove 24 generated around an axis lying in the plane of surface 10 and adapted to slidably receive complementary tongues 26 formed on trunnions 28 and 30. Trunnions 28 and 30 are connected for unitary movement by a pair of parallel tie rods 32 and 34 extending between the trunnions and having reduced and threaded end portions projecting through suitable axially aligned holes in the trunnions. Nuts 36 secured to the threaded tie rod ends lock tie rods 32 and 34 and trunnions 28 and 30 into an integrated support assembly rockably supported by the arcuate tongues 26 and grooves 24.

Tie rods 32 and 34 extend substantially beyond trunnion 28 for supporting the motor assembly including plate 40 pivotally secured as at 42 to motor support bracket 44 rigidly suspended from the extended ends of tie rods 32 and 34. In the illustrated embodiment bracket 44 is formed with a pair of spaced parallel bores adapted to receive the ends of tie rods 32 and 34. Set screws 46 are provided to engage in grooves 48 on the tie rods thereby preventing accidental dislocation of the bracket while permitting easy removal of the motor assembly when desired. Plate 40 is formed with a portion 50 adapted to abut portion 52 of bracket 44 to limit the downward pivotal movement of the motor to the position shown in dotted lines when the drive belt is removed.

A circular saw arbor 54 is carried by an arbor bracket 56 which is pivotally mounted on trunnion 30 by means of shaft 58 passing through bearing boss 59 projecting from the trunnion. Set screw 60 fitting into an annular groove in shaft 58 is provided to prevent accidental dislocation of shaft 58.

Worm gear segment 62 carried by arbor bracket 56 below shaft 58 is adapted to cooperate with worm 64 carried on the inner end of shaft 66 journalled in a suitable bushing 67 secured in trunnion 30 as by nut 68. The outer end of shaft 66 extends through an arcuate slot in cabinet wall 69 and carries adjustment handwheel 70 which provides a convenient means for rotating worm 64. Rotation of worm 64 causes arbor bracket 56 to pivot about shaft 58 to thereby raise or lower circular saw arbor 54.

The lower end of trunnion 30 is provided with a worm gear segment 72 most clearly shown in Figure 3. Gear segment 72 is engaged by worm 74 rotated by means of a handwheel (not shown) on shaft 78 which extends through the cabinet wall and is rotatably journalled in an offset bearing mount formed on the lower portion of trunnion bracket 20 as at 79 (Figure 1). Rotation of worm 74 by means of shaft 78 drives gear segment 72 causing trunnions 28 and 30 to slide in arcuate grooves 24 in trunnion brackets 18 and 20.

Thus the entire support assembly including trunnions 28 and 30, tie rods 32 and 34 and the motor mounting assembly together with the circular saw arbor assembly including bracket 56, arbor 54, shaft 58 and worm gear assembly 62, 64 is tilted as a unit to adjust the angle of arbor 54 about a horizontal axis lying in the plane of table 10 along the effective pivotal axis of the trunnions. The adjustment provided is such that the axis of arbor 54 can be tilted to an angle of approximately 45 degrees from its normal horizontal position.

The table and trunnion and motor mount thus far described is more fully disclosed and is claimed in copending application Serial No. 346,002 filed March 31, 1953 by George E. Rockwell owned by the assignee of this application and is merely illustrative of a suitable machine tool structure with which the saber saw accessory or auxiliary unit is adapted to be used in accordance with the present invention. The saber saw attachment itself comprises a housing 80 which is formed to be conveniently mountable on and removable from the support assembly under work table 10.

Referring now to Figures 1, 3, 4 and 5, the exterior of housing 80 contains an annular boss 82 having a through bore in which a shaft 84 is journalled for rotation by opposed bronze bearing sleeves or bushings 85. On opposite sides of and extending upwardly from boss 82 are two laterally spaced webs integral with the housing having parallel flat upper surfaces or mounting pads 86 and 88. On the side of housing 80 opposite that containing boss 82 and integral with housing 80 is a laterally centered web structure having a horizontal upper surface or mounting pad 90 and a vertically disposed supporting web 92.

A vertically extending annular boss 94 integrally formed in the upper surface of housing 80 has a through bore which receives and guides a plunger shaft 96 through bushings 97 for axial reciprocation. The ear-like formations 98 and 100 are formed integrally with the housing and merge into the opposite sides of boss 94. Square holes 102 and 104 are formed in each of ears 98 and 100 for slidably receiving rectangular mounting bars 106 and 108. The entire saber saw attachment is suspended between tie rods 32 and 34 of the support assembly against the rear trunnion by clamping the tie rods between web surfaces 86, 88 and 90 and the opposite ends of bars 106 and 108. Set screws 110 threaded into holes in the top of ears 98 and 100 bear on bars 106 and 108 to draw housing 80 upwardly to clampingly engage webs 86, 88 and 90 with the underside of the tie bars and secure bars 106 and 108 against inadvertent dislocation while permitting easy removal of the bars when desired.

The illustrated saber saw attachment includes a pulley 112 attached to the protruding end of shaft 84 upwardly of set screw secured shaft mounting collar 113 to turn with shaft 84. The opposite end of shaft 84 is provided with a combined crank and counterbalance segment 114 having crank pin 116 protruding from the inner face of the segment.

A crosshead 120 rigidly secured to the bottom of plunger 96 for reciprocating movement therewith has a transverse, hollow cylindrical portion 122 formed on its side end adjacent counterbalance 114. A crosshead pin or sleeve 124 is slidably received in the bore of portion 122. An axially extending slot 126 is formed in the face of cylindrical portion 122 to pass pin 116, the free end of which is received in a bore 128 in crosshead pin 124, and allows for the horizontal component of the movement of pin 116 as shaft 84 rotates.

The movement of crosshead 120 and plunger 96 is limited to reciprocating movement in a vertical plane by tongues 130 integrally formed on crosshead 120 and slidingly received in a vertical groove 133 formed in an end cap 131 of housing 80 by a pair of vertically extending spaced flanges 132 disposed along a center line of cap 131. An oil reservoir provided at the bottom of housing 80 is accessible for filling through a cap opening normally closed by a screw plug 135.

The hollow upper end of plunger 96 receives a conventional saber saw blade chuck assembly 134 for securing saw blade 136 at one end. A blade guide 138 is secured on a guide post 140 which is secured to a laterally offset ear 141 formed on boss 94 in vertically spaced relation above ear 100. A thumb screw 143 adjustably secures post 140 in place in ear 141. The upper end of scroll saw blade 136 extends through a circular opening 142 provided in saw table insert 16 in offset relation to the customary circular saw blade slot 144 and on the opposite side of the longitudinal axis of insert 16. When the saber saw blade 136 is used, table insert 16 is positioned so that the pivot axis for trunnions 28 and 30 passes through aperture 142 and, when the conventional circular saw blade is used, insert 16 is turned end for end to position slot 144 along the pivot axis for trunnions 28 and 30. To permit this shifting of insert 16, tool access opening 15 is so positioned in work table 8 that its longitudinal axis, viewed from the front of the machine, is off-set to the left from the pivot axis for trunnions 28 and 30 by a distance equal to one-half the distance between the center of slot 144 and the center of aperture 142. A principal advantage obtained is that tool access opening is adequately large to permit easy insertion and removal of the blades, while at the same time a solid table surface is disposed close to the blade to prevent tearing of the workpiece. The teeth of blade 136 are directed at right angles to the sides of insert 16 and face the front of the saw table.

The saber saw attachment is adapted to be installed quickly and easily in the following manner. The table insert 16, motor belt 146 and the circular saw blade (not shown) on arbor 54 are first removed. Screws 110 in ears 98 and 100 are then loosened and bars 106 and 108 of the saber saw attachment are removed. The attachment housing 80 is then inserted through the rear or motor end of the saw table cabinet pulley side at a level well below tie rods 32 and 34, and turned about one-half of a turn to dispose its pulley shaft parallel to the motor shaft. The attachment is then raised bodily upwardly to pass plunger 96 upwardly between and dispose housing 80 between tie rods 32 and 34 in firm abutting engagement against rear trunnion 28. Clamp bars 106 and 108 are then slipped into place over tie bars 32 and 34 and screws 110 are tightened to draw mounting pads 86, 88 and 90 firmly up against tie bars 32 and 34 so that the unit will be firmly held in place.

Pulley 112 on the saber saw attachment is then aligned with the motor pulley. Because the saber saw unit is located between the motor and the circular saw arbor, the belt used for driving the circular saw may also be used with the saber saw attachment. In this case, the belt is placed around the pulley on arbor 54, under pulley 112 and around the motor pulley. The pivotal movement of the motor about shaft 42 shortens the distance between the pulley axis by an amount sufficient to allow this belt to pass around pulley 112 of the saber saw unit. A separate belt which extends only between the motor and the saber saw attachment could be used if the extra cost or inconvenience is not objectionable.

After the belt is installed, saber saw blade 136 is inserted through access opening 15 into chuck 134 with the teeth facing away from the motor or forwardly of the table. Table insert 16 is then placed in position and the saber attachment is ready for operation.

The saber saw attachment is thus mounted between tie bars 32 and 34 with its pulley 112 outside of bar 34 and aligned with the motor pulley and pivots with trunnions 28 and 30 and arbor 54. It is, therefore, possible to easily and readily make accurate bevel or angle cuts with the novel mounting arrangement of the saber saw attachment using the conventional tilting arbor saw angle adjustment and scale and pointer for this purpose. Depth adjustments of saw arbor 54 by handwheel 70 have no control on the position or operation of the saber saw attachment except for changing the distance between the axis of the circular saw and saber saw pulleys and its accompanying change of the position of the motor when the belt passes around the circular saw pulley.

Since the motor is mounted on a plate secured to tie bars 32 and 34 which pivots with trunnions 28 and 30, the saber saw attachment and the motor tilt with the saw blade in unison and their respective pulleys are thereby maintained in alignment in all positions of angular adjustment.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In combination with a machine tool having an apertured work support table and a motor and tool supporting assembly including a pair of spaced horizontal bars disposed beneath said table to support said tool for normally operating on a workpiece through said table aperture: a saber saw attachment comprising a housing having mounting pads on opposite sides thereof adapted to cooperate with said horizontal bars; removable clamp elements attachable to said housing in a position opposed to said mounting pads and adapted to clampingly engage said horizontal bars between said pads and clamp elements; a reciprocable plunger disposed with its free end beneath said table aperture; a drive mechanism for reciprocating said plunger; means on said free end of said plunger for removably securing a saber saw blade to said plunger; a saw blade secured in said last named means and extending through said table aperture into position to saw a work piece fed thereto along said work table; and drive means for selectively interconnecting said machine tool motor and said driving mechanism whereby said saber saw attachment and said machine tool may be alternately employed on workpieces supported on said work support table.

2. The combination defined in claim 1 wherein said supporting assembly is tiltably suspended beneath said work support table for tilting movement around an axis lying in the plane of the table support surface and the saber saw blade lies along a radius having said axis as a center thereby assuring accurate anglar cutting by said blade irrespective of the tilted position of said support assembly.

3. The combination defined in claim 1 wherein said drive mechanism comprises a shaft journalled in said housing for rotation around an axis intersecting the axis of said plunger; said shaft having one end protruding from said housing and a crank arm secured to the other end for rotation therewith; a cross-head carried by the other end of said plunger and operably connected to said crank arm whereby upon rotation of said shaft and crank arm reciprocation of said plunger will be effected and a drive wheel connected to the protruding end of said shaft and adapted for driving connection to said motor.

4. In combination: a saw mechanism having a saber saw blade supported for reciprocating movement; a work table having an apertured horizontal working surface; a pair of spaced trunnions; a pair of spaced parallel tie rods rigidly connecting said trunnions for unitary movement; means depending from said work table respectively adjacent the front and rear edges thereof for supporting said trunnions for movement around an axis lying in the plane of said working surface and along a line passing through the aperture of said surface; an arbor for rotatably carrying a circular saw; means supporting said arbor on said trunnions for vertical adjustment with respect thereto in a plane containing said axis; means for adjustably clamping said saw mechanism between and longitudinally along said spaced tie rods with the saber saw blade extending through the aperture in said working surface in said plane containing said axis; and a source of rotary power supported by said trunnions for optionally driving said saw mechanism and the circular saw arbor.

5. A saber saw attachment for use with a circular saw or like machine tool having an apertured work support table and a motor and a tool support structure disposed beneath said table comprising a box-like housing, a first boss protruding from one side face and having a bore therein extending through said side face to the interior of said housing, a second boss protruding from a second face at right angles to said first boss and having a bore therein extending through said second face to the interior of said housing, shaft means journalled in the bore of said first boss with its ends protruding from the opposite ends of said annular bore; a drive wheel secured to the outer end of said shaft adapting said shaft for driving connection to said machine tool motor; a plunger guided for reciprocating movement in the bore of said second boss with its ends protruding from the opposite ends of said bore; a saw blade socket mounted on the outer end of said plunger, and means for removably mounting said housing to said tool support structure with said drive wheel in position for connection to said motor and said outer end of said plunger opposite the aperture in said work support table comprising a plurality of pad-like formations extending from opposed side faces of said housing at right angles to said plunger axis, loop formations at opposite sides of said second boss with their loop openings extending in a direction paralleling the surfaces of said pad-like formations, a clamp bar individual to each of said loop formations adapted to be freely received in said loop openings with their opposite ends extending beyond said opposed housing side faces and defining with said pad-like formations opposed clamp faces for receiving portions of said frame therebetween, and clamp screws threaded into said loop formations and arranged to bear on said clamp bars whereby, upon threading of said screws into said loop formations, said housing will be bodily moved toward said clamp bars thereby clampingly engaging said frame portions between said pad-like formations and said clamp bars.

6. In combination: a machine tool having an apertured work support table; a pair of spaced trunnions; a pair of spaced bars rigidly connecting said trunnions for unitary movement; means depending from said work table respectively adjacent the front and rear edges thereof for supporting said trunnions for movement around an axis lying in the plane of said working surface and along a line passing through the aperture of said surface; a motor carried by said trunnions; a tool support structure comprising a housing having a first boss protruding from one side face and having a bore therein extending through said side face to the interior of said housing; a second boss protruding from a second face at right angles to said first boss and having a bore therein extending through said second face to the interior of said housing; shaft means journalled in the bore of said first boss with its ends protruding from the opposite ends of said bore; a drive wheel secured to the outer end of said shaft adapting said shaft for driving connection to said machine tool motor; a plunger guided for reciprocating movement in the bore of said second boss with its ends projecting from opposite ends of said bore; tool holding means mounted on the outer end of said plunger; and means for removably mounting said housing between said pair of spaced bars with said drive wheel in position for connection to said motor and said outer end of said plunger aligned with the aperture in said work support table comprising a plurality of pad-like formations extending from opposite sides of said housing angularly related to said plunger axis contacting the underneath side of said spaced bars, clamp means on said opposite sides of said housing facing said pad-like formations including a member movable to engage the upper side of said spaced bars, and means to force said last mentioned member toward said pad-like formations to raise said pad-like formations against the underneath side of spaced bars to secure said housing to said machine tool.

7. In a machine tool having a work support table and a tiltable tool support mounted below said table for tilting movement around an axis lying in the plane of the work supporting surface of said table and tool driving means for selectively driving either of a pair of differently shaped upwardly extending cutting tools: means in said table for alternately and selectively receiving and closely encompassing said differently shaped upwardly extending power driven tools carried by said tool support for relative tilting movement with respect to said table comprising a table aperture elongated in the direction of said tilting axis and having its longitudinal center line offset to one side of said tilting axis and support formations extending into said aperture in a plane below the work support surface of said table; and an insert plate dimensioned to rest upon said support formations and fill up said aperture and having offset to one side in normal use of said machine tool with one of said tools in use an aperture the axis of which coincides with said tilting axis and said one tool and shaped to closely encompass said one of said tools and having offset to the other side in position to be disposed in vertical alignment with said other of said pair of tools when said other tool is in use a second aperture shaped to closely encompass the other of said pair of tools, the axis of said second aperture being positioned to coincide with said tilting axis when said other tool is to be used and said insert plate is turned end for end.

8. In a work table having a generally planar working surface, an elongated aperture for alternatively receiving a circular saw blade and a saber saw blade and having a central longitudinal axis in said surface, a support means connected to the work table and extending under said working surface, trunnion means mounting said support means for pivotal movement about an axis lying in the plane of said working surface, said support means having a first portion carrying an arbor for supporting said circular saw blade in a position to intersect the plane of said working surface along a predetermined line of intersection offset from said central longitudinal axis of the elongated aperture and having a second portion adapted to support a saber saw mechanism when the circular saw is removed, said saber saw mechanism being supported with its blade intersecting said plane of said working surface along said predetermined line, a motor carried by said support means for optionally driving said saber saw mechanism and said arbor, and a reversible table insert fitting in said elongated aperture having an elongated slot on one side of its central longitudinal axis adapted to receive the circular saw, and an opening on the opposite side of the longitudinal axis of said table insert adapted to receive the saber saw blade when said table insert is reversed.

9. In combination: a work table having an apertured working surface; a supporting assembly beneath said work table; a saber saw mechanism; detachable means adjustably mounting said saber saw mechanism to said supporting assembly; said saber saw mechanism comprising a housing; a horizontal rotatable shaft journalled in a side of the housing and extending into the housing; a vertically reciprocating shaft slidably mounted in the top of the housing at right angles to said horizontal shaft and extending into the housing; an eccentric crank pin and a counterbalance rigid with the end of said horizontal shaft in said housing; a crosshead rigid with the end of said vertical shaft in said housing; said crosshead having a hollow cylindrical portion transverse to said vertical shaft; an axially extending slot in said cylindrical portion; a sleeve slidably mounted in said cylindrical portion; said crank pin extending through said slot and rotatably connected to said sleeve; a tongue formed on said crosshead; a vertical groove formed on an inside wall of said housing opposite the side in which said horizontal shaft is journalled; the end of said tongue being slidable in said vertical groove; a saber saw mounted on the outer end of said vertical shaft and extending through said apertured work table; a pulley mounted on the outer end of said horizontal shaft; and motor and belt means for driving said pulley.

References Cited in the file of this patent

UNITED STATES PATENTS

| | | |
|---|---|---|
| 2,367,864 | Hein | Jan. 23, 1945 |
| 2,506,736 | Oschwald | May 9, 1950 |
| 2,547,922 | Bechtold | Apr. 10, 1951 |
| 2,652,863 | Grabinski | Sept. 22, 1953 |
| 2,725,905 | Pulera | Dec. 6, 1955 |

OTHER REFERENCES

Delta-Rockwell broadside AD–891, Sept. 9, 1954.